A. M. ROSS.
SCRAP METALS FOR CASTINGS.
No. 176,689. Patented April 25, 1876.
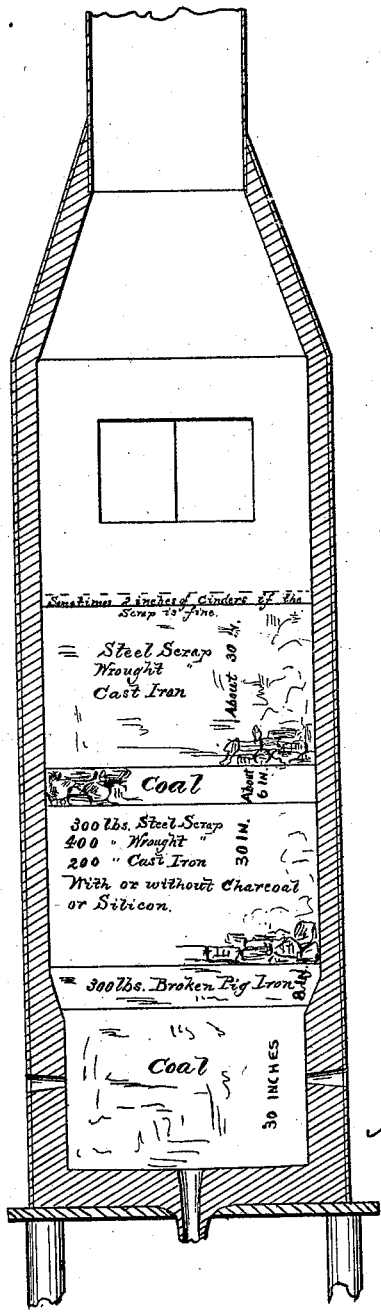

UNITED STATES PATENT OFFICE.

ALBERT M. ROSS, OF ILION, NEW YORK.

IMPROVEMENT IN SCRAP METAL FOR CASTINGS.

Specification forming part of Letters Patent No. 176,689, dated April 25, 1876; application filed November 1, 1875.

*To all whom it may concern:*

Be it known that I, A. M. Ross, of Ilion, in the county of Herkimer and State of New York, have invented certain Improvements in Making Castings from Scrap, of which the following is a specification:

My invention consists in a new method or process for producing a peculiar quality of cast-iron from a combination of scrap-steel, wrought iron, and pig or scrap cast-iron, all melted together in a cupola, as hereinafter more fully described.

The object of my invention is to produce a metal from which plows and similar articles can be cast, which shall be very hard, so as to scour or polish by friction in use, thereby preventing the adhesion of the soil, and which, at the same time, shall be much stronger than ordinary cast-iron so as to give the requisite strength with a less quantity or weight of metal, whereby the articles may be made lighter—thus combining the maximum of durability, lightness, and strength.

Various attempts have heretofore been made to melt scrap-steel with wrought and cast iron in a cupola, but usually without success for the reason that, in the process of melting them, the steel is burned, as it is termed, and thereby destroyed or seriously injured in quality.

By study and experiment, I have succeeded in devising a method or process by which these metals can be melted in a cupola without injuring the steel, and by which I am enabled to produce a metal possessing the desired qualities hereinbefore mentioned.

This method or process will be readily understood by the following description and the accompanying drawing, which illustrates the manner of arranging the metals to be operated upon in the cupola.

The materials used consist ordinarily of the scrap or pieces of steel resulting from the manufacture of steel plows and similar articles, varying in size from half an ounce up to two pounds, or even more, and scrap wrought-iron of a similar character, including the small pieces produced by shearing and punching in the process of manufacturing articles from wrought-iron, together with old cast-plate, such as old-plow or similar castings, broken up into small pieces. In case a sufficient quantity of the latter is not readily attainable, and to save the labor of breaking up pig-iron, I have cast-iron run into thin plates, having grooves formed in it at right angles, or of any form or style, so as to enable it to be readily broken up into small fragments, corresponding in size to the pieces of steel and wrought-iron.

Having thus prepared the materials, I then charge the cupola as follows: I first fill in coal to about thirty inches above the tuyeres, and on that place a layer of the cast-iron of, say, three hundred pounds. Above this I make another layer of the broken cast-iron, two hundred pounds; wrought-iron scrap, four hundred pounds; and steel scrap, three hundred pounds, all mixed together. If it be desired to increase the charge it may be done by placing on the above a layer of about six inches of coal, and on this place another layer of the mixed scrap metals of the same proportions as last stated. If the scrap be very fine, I place over the top a layer of cinders about two inches thick, though this is not absolutely necessary.

It will, of course, be understood that it is not necessary to repeat the layers of the scrap metals, as represented in the drawing and described above, except in cases where the charge is too large to be included in the lower or first layers; and that, in case of very large charges, the upper layer may be repeated several times. In case a single layer only is used, the amount of pig-iron will be varied accordingly, so that the proper proportion of cast-iron may be retained.

When thus prepared and arranged in the cupola, the material may be melted without injury to the steel, and the resulting product will be found to be a compound metal which is very fluid, and therefore readily cast in any desired form or shape. If it be desired to have the castings very hard, they should be taken from the molds as soon as possible, as the longer they remain in the sand the softer they will be.

The proportions of the materials used may be varied somewhat, as, for instance, three hundred and fifty pounds of steel, four hundred and fifty of wrought, and five hundred of cast, iron give a good result. Again, I find a mixture of two hundred and fifty pounds of steel, four hundred of wrought, and five hundred of cast, iron, with fifteen per cent. of silicon, treated as above described, will operate well and give a good product, the effect of adding the silicon being to furnish or produce a good flux for the materials. The addition of about two per cent. of charcoal, mixed in with the layers of steel, wrought, and cast materials, I find to be beneficial in many cases, though it is not absolutely necessary, especially when the proportions last named are used. Its effect is to aid in equalizing the melting of the different materials, and to prevent the wrought-scrap from adhering or welding together before melting.

One of the important features of this process is the preparation of materials by reducing the several kinds to pieces of nearly equal size; and another is the manner of arranging them in the cupola. By following the description herein given good results may be obtained almost invariably.

Although the metal produced by this process is exceedingly hard, it is also very strong, and therefore plows and other castings made from it may be made proportionately lighter. It also possesses the quality of being annealed, so that articles made from it can be readily hammered and drilled.

It will be readily seen that a metal possessing these several and various qualities is adapted to a great variety of purposes, and is therefore exceedingly valuable. By this process the scrap or waste material produced in manufacturing establishments can be at once utilized, and converted, by the single operation of melting, into a most useful, and therefore valuable, product. One of its greatest advantages is that it utilizes the steel scrap by enabling it to be melted with the other material in a cupola, without injury to the steel—a result hitherto generally thought to be impossible.

Having thus described my invention, what I claim is—

1. The herein-described process of producing cast metal from scrap steel, cast and wrought iron, which consists in first reducing the different metals to pieces of nearly uniform size, and then arranging them in a cupola-furnace, substantially as and in the proportions specified, in layers of coal, cast-iron, and a mixture of cast, wrought, and steel scrap, successively, substantially as set forth.

2. As an improved metal for castings, the product of scrap steel, wrought-iron, and cast-iron (the steel and wrought-iron preponderating in the charge) melted together, substantially as shown and described.

ALBERT M. ROSS.

Witnesses:
   D. LEWIS,
   J. L. OSGOOD.